US009501071B2

(12) United States Patent
Shah

(10) Patent No.: US 9,501,071 B2
(45) Date of Patent: Nov. 22, 2016

(54) METHOD AND APPARATUS FOR ESTABLISHING A SET BACK TEMPERATURE FOR AN ENVIRONMENTAL CONTROL SYSTEM

(75) Inventor: Rajendra K. Shah, Indianapolis, IN (US)

(73) Assignee: CARRIER CORPORATION, Farmington, CT (US)

(*) Notice: Subject to any disclaimer, the term of this patent is extended or adjusted under 35 U.S.C. 154(b) by 583 days.

(21) Appl. No.: 13/991,262

(22) PCT Filed: Feb. 14, 2012

(86) PCT No.: PCT/US2012/024977
§ 371 (c)(1),
(2), (4) Date: Jun. 3, 2013

(87) PCT Pub. No.: WO2012/112494
PCT Pub. Date: Aug. 23, 2012

(65) Prior Publication Data
US 2013/0325193 A1 Dec. 5, 2013

Related U.S. Application Data
(60) Provisional application No. 61/442,525, filed on Feb. 14, 2011.

(51) Int. Cl.
G05D 23/19 (2006.01)
F24F 11/00 (2006.01)
(52) U.S. Cl.
CPC ............. G05D 23/19 (2013.01); F24F 11/006 (2013.01); G05D 23/1904 (2013.01); F24F 2011/0073 (2013.01); F24F 2011/0075 (2013.01); F24F 2011/0094 (2013.01)

(58) Field of Classification Search
CPC . G05D 23/19; G05D 23/1904; F24F 11/006; F24F 2011/0073; F24F 2011/0094; F24F 2011/0075
USPC .................................. 700/276–277, 299–300
See application file for complete search history.

(56) References Cited

U.S. PATENT DOCUMENTS 4,347,974 A 9/1982 Pinckaers et al.
4,442,972 A 4/1984 Sahay et al.
(Continued)

FOREIGN PATENT DOCUMENTS

WO 2012112494 A1 8/2012

OTHER PUBLICATIONS http://www.aij.or.jp/jpn/symposium/2006/loads/Chapter8_com.pdf, "thermal loads", Sep. 2006, pp. 2.*
(Continued)

Primary Examiner — Kenneth M Lo
Assistant Examiner — Olvin Lopez Alvarez
(74) Attorney, Agent, or Firm — Cantor Colburn LLP

(57) ABSTRACT

A method for establishing a set back temperature for an environmental control system includes entering an energy saver control phase having a predetermined time period, determine an effective thermal load for an environmental control zone, calculating a set-back temperature based on the effective thermal load for the environmental control zone and the predetermined time period, operating an environmental control device to establish and maintain the set-back temperature for a portion of the predetermined time period, and operating the environmental control device to establish a desired temperature substantially by an end of the predetermined time period.

26 Claims, 4 Drawing Sheets

(56) References Cited

U.S. PATENT DOCUMENTS

| | | | |
|---|---|---|---|
| 4,522,336 A * | 6/1985 | Culp | G05D 23/1904 236/46 R |
| 4,674,027 A * | 6/1987 | Beckey | G05D 23/1904 165/238 |
| 4,873,649 A * | 10/1989 | Grald | F24F 11/0009 62/176.6 |
| 4,911,358 A * | 3/1990 | Mehta | G05D 23/1904 165/239 |
| 5,025,984 A | 6/1991 | Bird et al. | |
| 5,197,666 A | 3/1993 | Wedekind | |
| 5,219,119 A | 6/1993 | Kasper et al. | |
| 5,261,481 A | 11/1993 | Baldwin et al. | |
| 5,270,852 A * | 12/1993 | Tsuchiya | G02F 1/293 359/211.1 |
| 5,454,511 A | 10/1995 | Van Ostrand et al. | |
| 5,555,927 A * | 9/1996 | Shah | G05D 23/1904 165/239 |
| 5,822,997 A * | 10/1998 | Atterbury | F25B 13/00 165/239 |
| 6,478,084 B1 | 11/2002 | Kumar et al. | |
| 6,536,675 B1 | 3/2003 | Pesko et al. | |
| 6,843,068 B1 | 1/2005 | Wacker | |
| 7,099,748 B2 * | 8/2006 | Rayburn | F24F 11/006 165/238 |
| 7,644,869 B2 | 1/2010 | Hoglund et al. | |
| 7,802,618 B2 | 9/2010 | Simon et al. | |
| 2010/0243231 A1 * | 9/2010 | Rosen | G05D 23/1919 165/237 |
| 2011/0130881 A1 * | 6/2011 | Nanami | F24F 3/044 700/277 |

OTHER PUBLICATIONS

International Preliminary Report on Patentability for corresponding PCT Application No. PCT/US2012/024977, dated Aug. 29, 2013, pp. 1-9.

International Search Report and Written Opinion for PCT Application No. PCT/US2012/024977, dated Jun. 5, 2012, pp. 1-13.

* cited by examiner

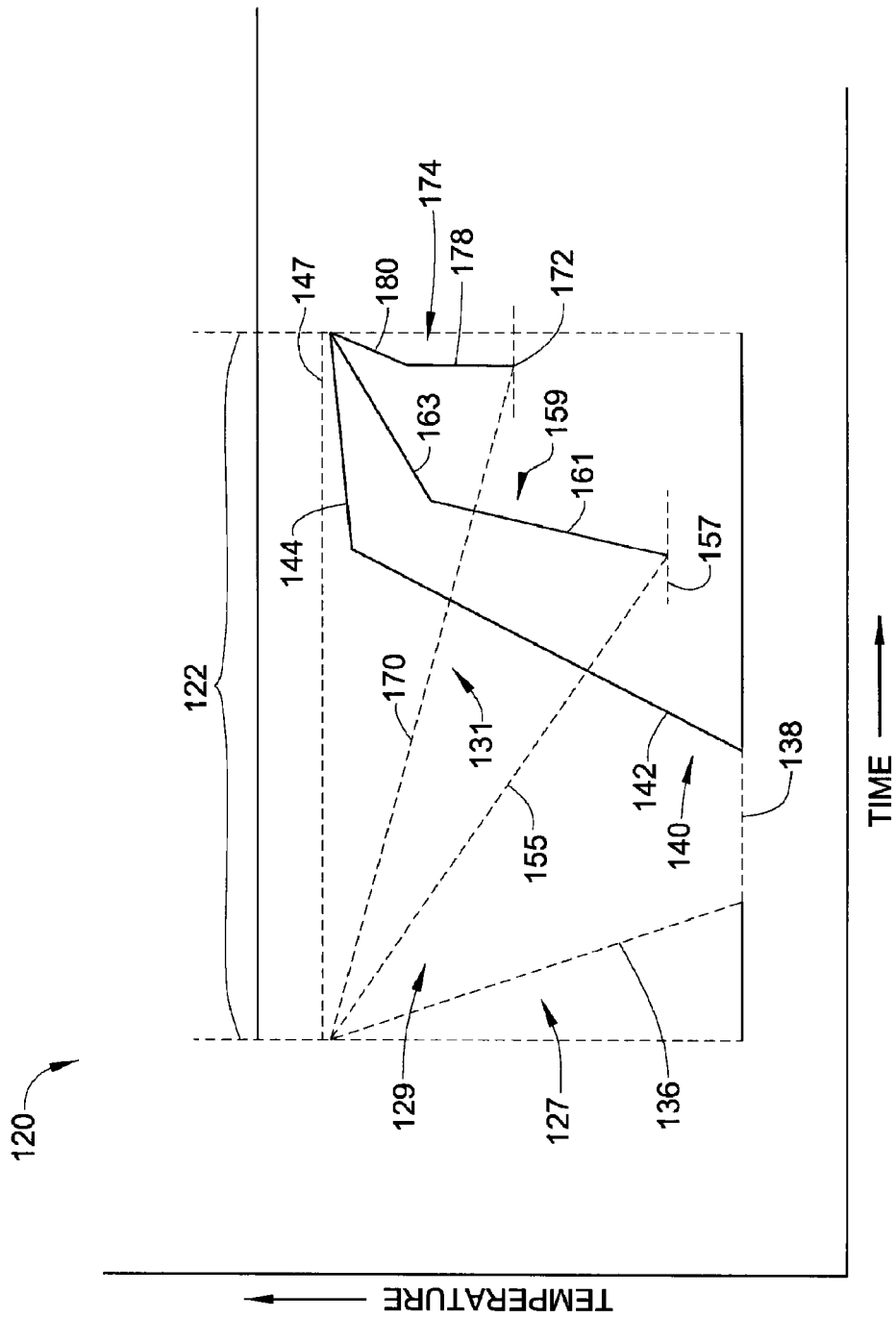

METHOD AND APPARATUS FOR ESTABLISHING A SET BACK TEMPERATURE FOR AN ENVIRONMENTAL CONTROL SYSTEM

CROSS REFERENCE TO RELATED APPLICATIONS

This application is a National Stage Application of PCT Application No. PCT/US12/024,977 filed Feb. 14, 2012, which is a PCT Application of U.S. Provisional Patent Application No. 61/442,525 filed Feb. 14, 2011, the disclosures of which are incorporated by reference herein in their entireties.

BACKGROUND OF THE INVENTION

Exemplary embodiments pertain to the art of environmental control systems and, more particularly, to a method for establishing a set-back temperature for an environmental control system.

Environmental controls have evolved over time from simple temperature based controls to more conventional programmable controls. Programmable controls allow users to set a particular temperature in an environmental control zone for a particular time of day. More specifically, programmable controls or thermostats enable users to program a schedule of temperature set points for a fixed number of time periods over the course of a day. In some cases, a different schedule may be programmed for different days. In many cases, one of the time periods is designated to span a time when the environmental control zone is unoccupied.

As there is no need to maintain a comfortable temperature when the environmental control zone is unoccupied. Accordingly, may users program a lower temperature (for heating) or a higher temperature (for cooling) for the environmental control zone during unoccupied periods. Depending on the lowered temperature, or degree of set back, a user can save on heating/cooling costs. Unfortunately, many users will set too great or too little of a set back. Too great a set back leads to a prolonged recovery time which, in turn leads to the environmental control zone not returning to the comfortable temperature at a desired time and inefficient operation of heating/air conditioning systems. As such, many users do not see any benefit to establishing a set back temperature. Setting too little of a set back also leads to lost savings. That is, a greater savings could potentially be realized with a higher set back. In addition, obtaining optimal savings would require a user to re-program the set back every day as recovery time is related current environmental control zone and outdoor temperature conditions.

BRIEF DESCRIPTION OF THE INVENTION

Disclosed is a method for establishing a set back temperature for an environmental control system. The method includes entering an energy saver control phase having a predetermined time period, determining an effective thermal load for an environmental control zone, calculating a set-back temperature based on the effective thermal load for the environmental control zone and the predetermined time period, operating an environmental control device to establish and maintain the set-back temperature for a portion of the predetermined time period, and operating the environmental control device to establish a desired temperature substantially by an end of the predetermined time period.

Also disclosed is a programmable control unit including a controller, and a memory operatively connected to the controller. The memory includes a computer readable program which, when executed by the controller, causes the controller to enter an energy saver control phase having a predetermined time period, determine an effective thermal load for an environmental control zone, calculate a set-back temperature based on the effective thermal load for the environmental control zone and the predetermined time period, operate an environmental control device to establish and maintain the set-back temperature for a portion of the predetermined time period, and operate the environmental control device to establish a desired temperature at an end of the predetermined time period.

Further disclosed is an environmental control system including a plurality of environmental control devices configured and disposed to condition an environmental control zone, and a programmable control unit operatively connected to the plurality of environmental control devices. The programmable control unit includes a controller, and a memory operatively connected to the controller. The memory includes a computer readable program which, when executed by the controller, causes the controller to enter an energy saver control phase having a predetermined time period, determine an effective thermal load for an environmental control zone, calculate a set-back temperature based on the effective thermal load for the environmental control zone and the predetermined time period, operate an environmental control device to establish and maintain the set-back temperature for a portion of the predetermined time period, and operate the environmental control device to establish a desired temperature at an end of the predetermined time period.

BRIEF DESCRIPTION OF THE DRAWINGS

The following descriptions should not be considered limiting in any way. With reference to the accompanying drawings, like elements are numbered alike:

FIG. 4 is a graph illustrating various set-back temperatures and recovery time periods in accordance with another aspect of the exemplary embodiment.

DETAILED DESCRIPTION OF THE INVENTION

A detailed description of one or more embodiments of the disclosed apparatus and method are presented herein by way of exemplification and not limitation with reference to the Figures.

Figure 1:
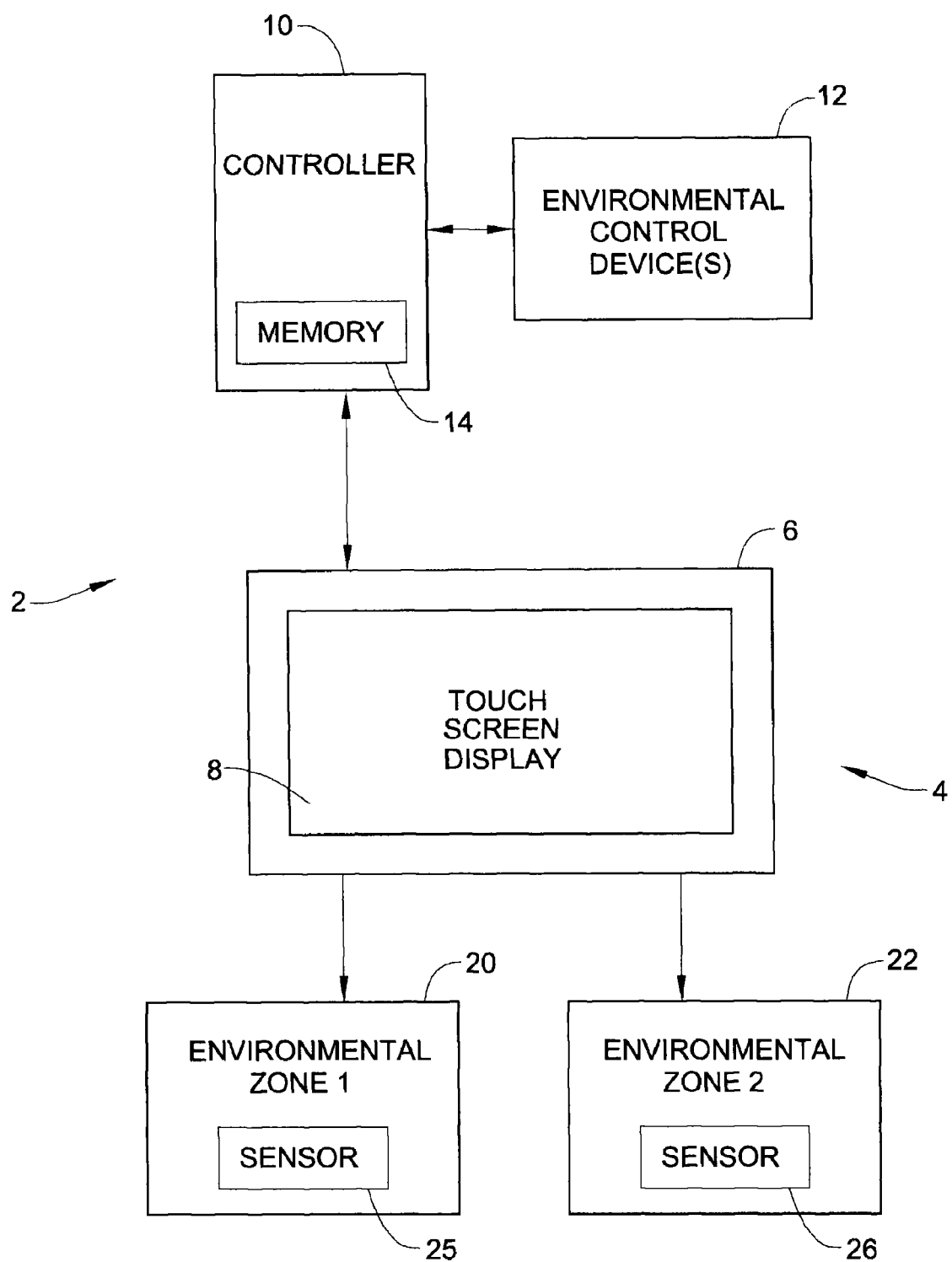
FIG. 1 is schematic diagram illustrating an environmental control system having a programmable control unit that establishes a set-back temperature in accordance with an exemplary embodiment.

With reference to FIG. 1, an environmental control system in accordance with the exemplary embodiment is indicated generally at 2. Environmental control system 2 includes a programmable control unit 4. Programmable control unit 4 includes a housing 6 and a user input/output device shown in the form of a touch screen display 8 that allows a user to establish and view various environmental control parameters or conditions for one or more environmental control zones as will be detailed more fully below. Programmable control unit 4 also includes a controller 10 that is operatively connected to one or more environmental control device(s) 12. Controller 10 includes a memory 14 that stores various programs for controller 10 one of which will be detailed more fully below. At this point it should be understood that while shown with touch screen display 8, programmable control unit 4 can be provided with other mechanisms that accept user inputs such as buttons or key pads in combination with a liquid crystal display (LCD) screen that displays current and desired temperature information. Also, while shown with an integrated controller, programmable control unit 4 could be operatively connected to a controller located remote from housing 6.

In the exemplary embodiment shown, programmable control unit 4 is configured to establish desired environmental parameters, e.g., temperature, humidity, and/or airflow for first and second environmental control zones 20 and 22 each having an associated sensor 25 and 26. Of course it should be understood that programmable control unit 4 could also be used to control a single environmental control zone, or more than two environmental control zones.

In accordance with the exemplary embodiment, programmable control unit 4 can be set to an energy savings period when, for example, one or more of environmental control zones 20 and 22 are unoccupied. During unoccupied periods, adjusting environmental parameters, for example, lowering temperatures during heating modes and raising temperatures during cooling modes will lead to energy and cost savings for the user. As will be discussed more fully below, when entering an energy savings period, programmable control unit 4 calculates and establishes a unique set-back temperature for existing environmental conditions. The set-back temperature is based on, in part, an effective thermal load for the environmental control zone and a time duration of the energy savings phase.

Figure 2:
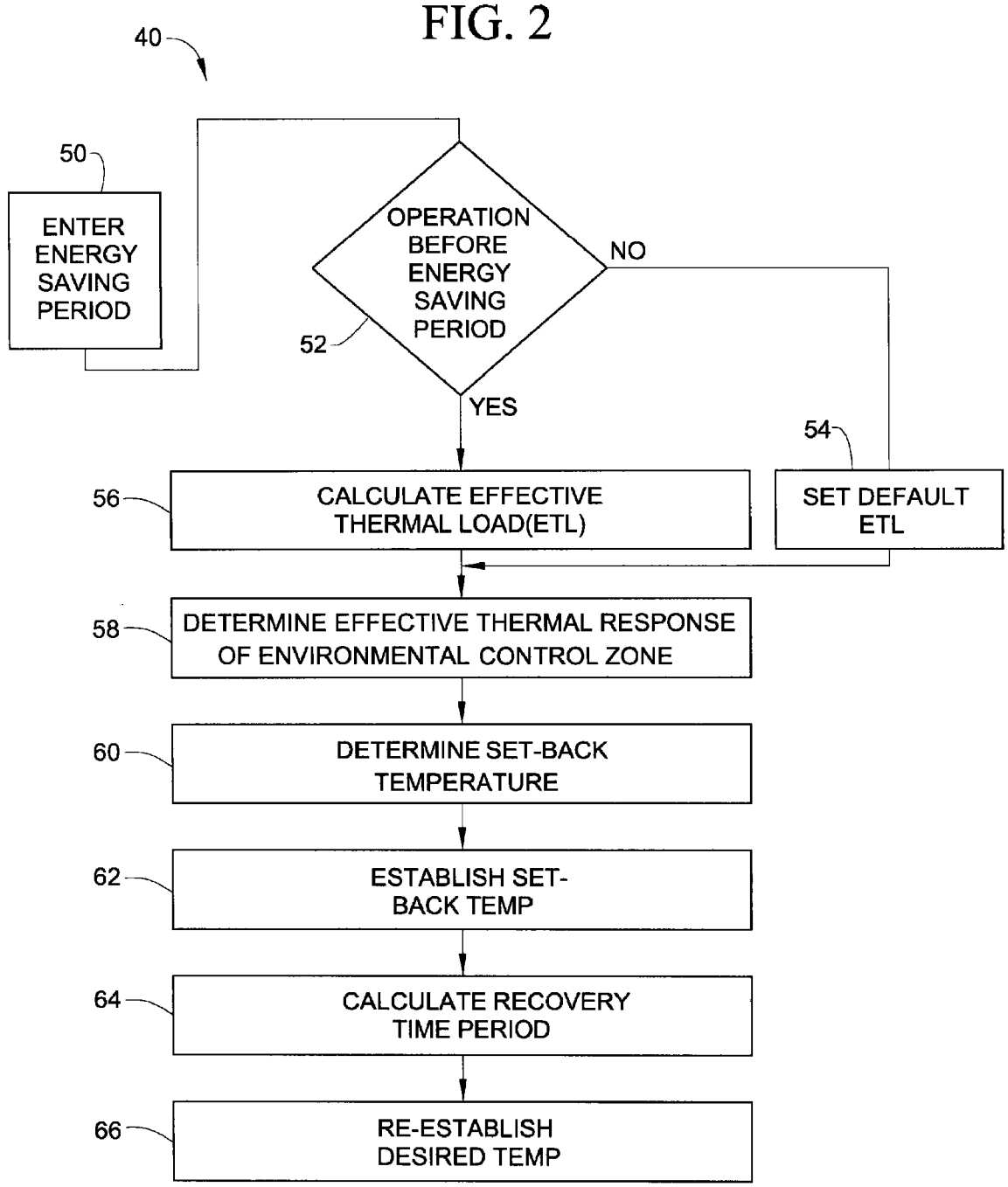
FIG. 2 is a flow diagram illustrating a method of establishing a set-back temperature for an environmental control system in accordance with an exemplary embodiment.

Reference will now be made to FIG. 2 in describing a method 40 of establishing a set-back temperature in accordance with an exemplary embodiment. Initially, controller 10 determines whether programmable control unit 4 is set to establish an energy saving period for an environmental control zone as indicated in block 50. Once an energy saving period is entered, a determination is made whether environmental control device(s) 12 were previously in operation in block 52. If environmental control device(s) 12 were not in operation, a default effective thermal load (ETL) is set for the environmental control zone as indicated in block 54. If environmental control device(s) 12 were in operation prior to entering the energy savings period, controller 10 calculates an ETL for the environmental control zone as indicated in block 56. The ETL is determined based on a coast down (heating) or coast up (cooling) trend, or change in temperature of the environmental control zone during periods following operation of environmental control device(s) 12.

After calculating ETL, controller 10 determines an effective thermal response (ETR) of the environmental control zone as indicated in block 58. ETR represents a ratio of a net capacity of environmental control device(s) 12 to a rate of change of temperature of the environmental control zone. Net capacity is represented by a difference between capacity delivered by environmental control device(s) 12 and the ETL. In accordance with one aspect of the exemplary embodiment, prior to entering an energy savings period, controller 10 monitors an average maintenance capacity, or the capacity required to maintain the desired temperature, over a period of time. In addition, controller 10 monitors maintenance rate or a rate of change of temperature over the period of time. During a heating mode, the maintenance rate is a positive value, in a cooling mode, the maintenance rate is a negative value.

After determining ETL and ETR, controller 10 calculates a particular set-back temperature for the particular energy savings period as indicated in block 60. The particular set-back temperature represents a temperature value difference from the desired or comfort temperature. That is, during periods that the environmental control zone is unoccupied, it is not necessary to maintain the comfort temperature. As such, controller 10 determines at what temperature operation of environmental control device(s) 12 can be kept at minimum levels while still allowing for a return to the comfort temperature at an end of the particular energy saving period without using inefficient stages.

In accordance with one aspect of the exemplary embodiment, a user can establish a minimum set-back temperature. Controller 10 will then establish the particular set-back temperature to be at or above the selected minimum set-back temperature. Of course, it should be understood that there is no need to select a minimum set-back temperature. As the set-back temperature relates to current conditions, the particular set-back temperature calculated by controller 10 will generally be different for different energy savings periods. Once determined, controller 10 operates environmental control device(s) 12 to establish the particular set-back temperature as indicated in block 62. Generally, controller 10 pauses operation of environmental control device(s) 12 until the environmental control zone reaches particular set-back temperature. As the particular set-back temperature approaches, controller 10 will either operate environmental control system 12 to maintain the particular-set back temperate or start a recovery phase depending upon the duration of the energy savings period. It should also be understood that, if so configured, controller 10 could establish a first set-back temperature for first environmental control zone 20 and a second, distinct set-back temperature for second environmental control zone 22 based on existing environmental conditions.

Controller 10 also calculates a recovery time period for the recovery phase or the time required to return the environmental control zone to the comfort temperature, as indicated in block 64. In accordance with one aspect of the exemplary embodiment, controller 10 is programmed with data relating to installed stages of heating and cooling. In accordance with another aspect of the exemplary embodiment, controller 10 receives data relating to installed stages of heating and cooling directly from heating and cooling units as well as any other environmental control devices. The data includes estimated capacities and efficiencies for each heating/cooling stage. Heating stages may include gas furnace operation, heat pump operation and/or heat coil operation. Each stage includes associated capacities and efficiencies. A cooling unit, for example, can include multiple stages and multiple operating modes. Stages may represent discrete steps or may the heating/cooling units may be continuously variable. In this manner, controller 10 rules out inefficient stages based on user inputs or a determination of a necessity of those stages to maintain a desired or comfort temperature. Any remaining stages are then available for use during a recovery time period. Capacity of the remaining stages represents maximum available recovery capacity. In a multi-zone system, maximum available recovery capacity is reduced by capacity currently being delivered to all zones that are maintaining the comfort desired temperature.

As will be discussed more fully below, controller 10 will calculate one of a single stage recovery time period and a dual-stage recovery time period. In a single stage recovery time period, controller 10 calculates a recovery time period having a temperature/time slope that will lead to the comfort temperature. The magnitude of the slope is based on using the maximum available recovery capacity necessary to return the temperature of the environmental control zone to the comfort temperature. In contrast, in a dual-stage recovery time period, controller 10 calculates a recovery time period including a first recovery portion having a first time/temperature slope, and second recovery portion having a second time/temperature slope. During the first recovery portion of the recovery time period, environmental control device(s) 12 operate at maximum capacity to condition the environmental control zone to a temperature that is higher (heating) or lower (cooling) than the comfort temperature. During the second recovery portion of the recovery time period, environmental control device(s) 12 operate at a lower capacity to gradually bring the environmental control zone to the comfort temperature. In this manner, controller 10 operates environmental control device(s) 12 to return the environmental control zone to the comfort temperature as the energy savings period draws to a close as indicated in block 66.

Figure 3:
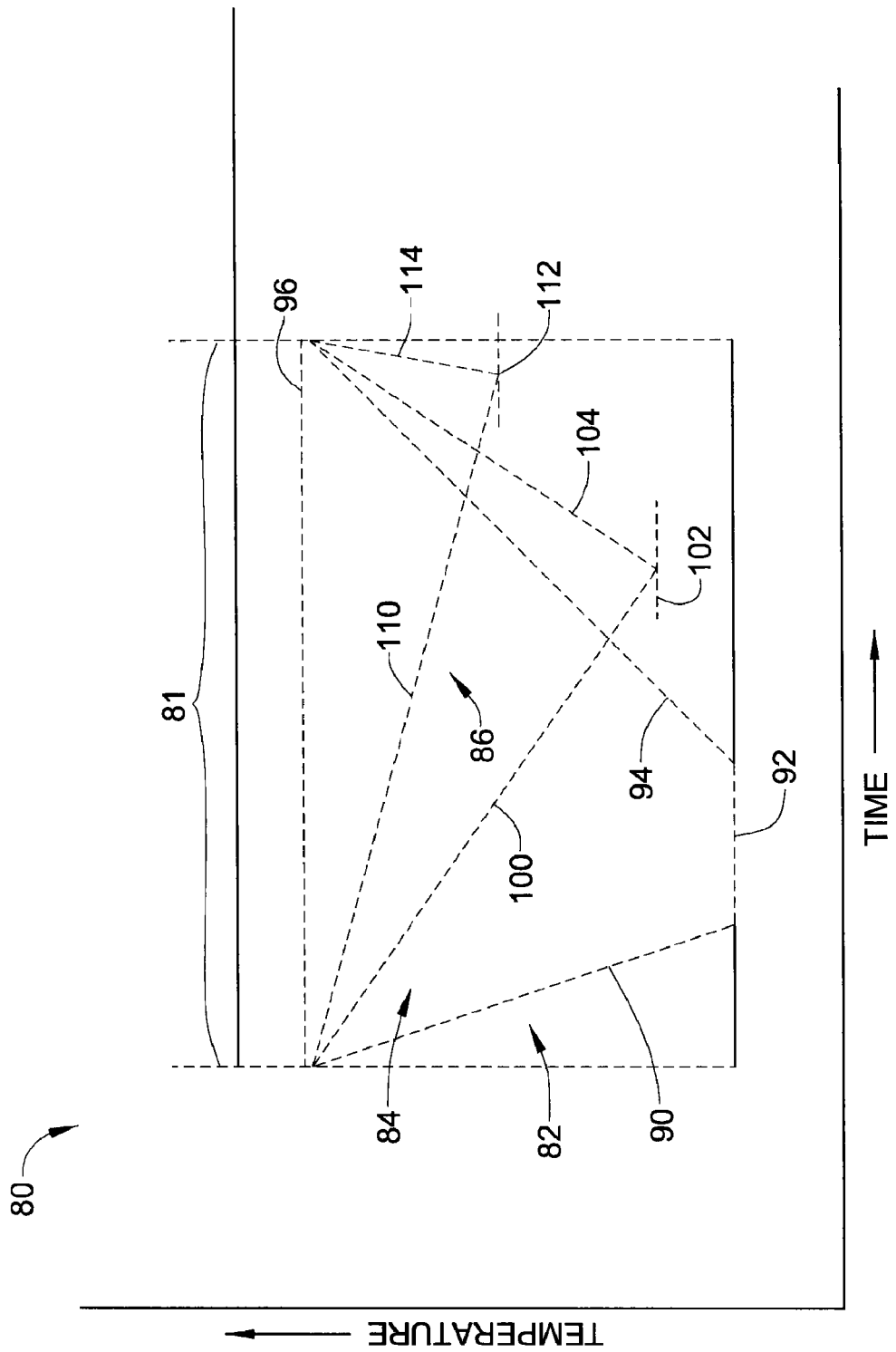
FIG. 3 is a graph illustrating various set-back temperatures and recovery time periods in accordance with one aspect of the exemplary embodiment.

Reference will now be made to FIG. 3 in describing set-back temperatures and single stage recovery time periods 80 in accordance with one aspect of the exemplary embodiment. In accordance with the exemplary embodiment shown, set-back temperatures are established for an energy saving period 81. Depending upon the ETL and ETR, controller 10 determines a desired set-back temperature. For example, in severely cold (or hot) weather, the coast down/up trend may be more severe than during more mild temperatures. As such, during extremely cold temperatures, controller 10 will establish a set-back curve such as shown at 82, during more moderate weather, controller 10 may establish a set-back curve such as shown at 84, and during mild weather, controller 10 may establish a set-back curve such as shown at 86.

As shown, set-back curve 82 includes a first or coast down period 90 having a steep slope. Coast down period 90 leads to a maintenance period 92 positioned at the set-back temperature calculated for set-back curve 82. Maintenance period 92 leads to a recovery time period 94 having a constant slope that leads from the set-back temperature to comfort temperature 96. Set-back curve 84 includes a coast down period 100 having a slope that is less severe than coast down period 90. The less severe slope is indicative of conditions that are more moderate than that for set-back curve 82. Coast down period 100 reaches a set-back temperature 102 and immediately transitions to a single stage recovery time period 104. Finally, set-back curve 86 includes a coast down period 110 having a slope that is less severe than the slope of coast down period 100. Coast down period 110 reaches a set-back temperature 112 and immediately transitions to a single stage recovery time period 114.

Reference will now be made to FIG. 4 in describing set-back temperatures and dual-stage recovery time periods 120 in accordance with another aspect of the exemplary embodiment. In accordance with the exemplary embodiment shown, set-back temperatures are established for an energy saving period 122. Depending upon the ETL and ETR, controller 10 determines a desired set-back temperature. In a manner similar to that described above, during cold temperatures, controller 10 will establish a set-back curve such as shown at 127, during more moderate weather, controller 10 may establish a set-back curve such as shown at 129, and during mild weather, controller 10 may establish a set-back curve such as shown at 131.

As shown, set-back curve 127 includes a first or coast down period 136 having a steep slope. Coast down period 136 leads to a maintenance period 138 positioned at the set-back temperature calculated for set-back curve 127. Maintenance period 138 leads to a recovery time period 140 having a first recovery portion 142 and a second recovery portion 144. First recovery portion 142 has a slope designed to cause environmental control device(s) 12 to achieve target a temperature that his higher than the comfort temperature. However, first recovery portion 142 terminates at a temperature that is less then the comfort temperature and second recovery portion 144 begins. Second recovery portion 144 has a slope that is designed to cause environmental control device(s) 12 to achieve a comfort temperature indicated at 147. Set-back curve 129 includes a coast down period 155 having a slope that is less severe than coast down period 136. As discussed above, the less severe slope is indicative of conditions that are more moderate than that for set-back curve 127. Coast down period 155 reaches a set-back temperature 157 and immediately transitions to a dual-stage stage recovery time period 159 having a first recovery portion 161 and a second recovery portion 163. Finally, set-back curve 131 includes a coast down period 170 having a slope that is less severe than the slope of coast down period 155. Coast down period 170 reaches a set-back temperature 172 and immediately transitions to a dual-stage recovery time period 174 having a first recovery portion 178 and a second recovery portion 180.

At this point it should be understood that programmable control unit 4 selectively establishes a set-back temperature for an energy savings phase based on environmental conditioning capacity, as well as thermal load, and thermal recovery of an environmental control zone. In this manner, a user can simply select an energy saving period with controller 10 establishing desired set back temperatures based on current environmental conditions. With controller 10 setting set-back temperatures, the user need not reprogram programmable control unit 4 each time environmental conditions change in order to increase energy savings.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method for establishing a set back temperature for an environmental control system, the method comprising:
   entering an energy saver phase having a predetermined time period;
   determining an effective thermal load for an environmental control zone;
   determining an effective thermal response of the environmental control zone, the effective thermal response representing a ratio of a net capacity of an environmental control device to a rate of change of temperature of the environmental control zone;

calculating a set-back temperature based on the effective thermal load for the environmental control zone, the effective thermal response of the environmental control zone and the predetermined time period;

operating an environmental control device to establish and maintain the set-back temperature for a portion of the predetermined time period; and operating the environmental control device to establish a desired temperature substantially by an end of the predetermined time period.

2. The method of claim 1, wherein determining the effective thermal load of the environmental control zone includes setting a default effective thermal load value.

3. The method of claim 1, wherein calculating the set-back temperature includes calculating the set-back temperature based, in part, on estimated capacities and efficiencies of the environmental control system.

4. The method of claim 3, wherein calculating the set-back temperature includes setting a set-back temperature that does not exceed the set-back temperature limit.

5. The method of claim 1, further comprising: establishing a set-back temperature limit.

6. The method of claim 1, wherein calculating the set-back temperature includes calculating a first set-back temperature for a first environmental control zone and a second set back temperature for a second environmental control zone, the first set-back temperature being independent of the second set-back temperature.

7. The method of claim 1, wherein operating the environmental control system to establish the desired temperature includes setting a recovery time period.

8. The method of claim 7, wherein setting the recovery time period includes determining a recovery time period in which maximum available recovery capacity is equal to total required recovery capacity.

9. The method of claim 7, wherein operating the environmental control system to establish the desired temperature includes operating the environmental control system at maximum available recovery capacity during a first recovery portion of the recovery time period and operating the environmental control system at a lower capacity during a second recovery portion of the recovery time period.

10. The method of claim 7, wherein operating the environmental control system to establish the desired temperature includes setting a target temperature that is distinct from the desired temperature, operating the environmental control system at a rate configured to establish the target temperature during a first recovery portion of the recovery time period, and operating the environmental control system at a rate configured to establish the desired temperature at a second recovery portion of the recovery time period.

11. A programmable control unit comprising:
a controller; and
a memory operatively connected to the controller, the memory including a computer readable program which, when executed by the controller, causes the controller to:
  enter an energy saver control phase having a predetermined time period;
  determine an effective thermal load for an environmental control zone;
  determine an effective thermal response of the environmental control zone, the effective thermal response representing a ratio of a net capacity of an environmental control device to a rate of change of temperature of the environmental control zone;
  calculate a set-back temperature based on the effective thermal load for the environmental control zone, the effective thermal response of the environmental control zone and the predetermined time period;
  operate an environmental control device to establish and maintain the set-back temperature for a portion of the predetermined time period; and
  operate the environmental control device to establish a desired temperature at an end of the predetermined time period.

12. The programmable control unit according to claim 11, wherein the computer readable program which, when executed by the controller, causes the controller to: set a default effective thermal load value.

13. The programmable control unit according to claim 11, wherein the computer readable program which, when executed by the controller, causes the controller to calculate the set-back temperature based, in part, on estimated capacities and efficiencies of the environmental control system.

14. The programmable control unit according to claim 11, wherein the computer readable program which, when executed by the controller, causes the controller to: calculate a first set-back temperature for a first environmental control zone and a second set back temperature for a second environmental control zone, the first set-back temperature being independent of the second set-back temperature.

15. The programmable control unit according to claim 11, wherein the computer readable program which, when executed by the controller, causes the controller to: set a recovery time period to re-establish the desired temperature.

16. The programmable control unit according to claim 15, wherein the computer readable program which, when executed by the controller, causes the controller to: determine a recovery time period in which maximum available recovery capacity is equal to total required recovery capacity to set the recovery time period.

17. The programmable control unit according to claim 15, wherein the computer readable program which, when executed by the controller, causes the controller to: operate the environmental control system at maximum available recovery capacity during a first recovery portion of the recovery time period and operating the environmental control system at a lower capacity during a second recovery portion of the recovery time period to re-establish the desired temperature.

18. The programmable control unit according to claim 15, wherein the computer readable program which, when executed by the controller, causes the controller to:
  set a target temperature that is distinct from the desired temperature;
  operate the environmental control system at a rate configured to establish the target temperature during a first recovery portion of the recovery time period; and
  operate the environmental control system at a rate configured to establish the desired temperature at a second recovery portion of the recovery time period to re-establish the desired temperature.

19. An environmental control system comprising:
a plurality of environmental control devices configured and disposed to condition an environmental control zone; and
a programmable control unit operatively connected to the plurality of environmental control devices, the programmable control unit including:
a controller; and a memory operatively connected to the controller, the memory including a computer readable program which, when executed by the controller, causes the controller to:
    enter an energy saver control phase having a predetermined time period;
    determine an effective thermal load for an environmental control zone;
    determine an effective thermal response of the environmental control zone, the effective thermal response representing a ratio of a net capacity of an environmental control device to a rate of change of temperature of the environmental control zone;
    calculate a set-back temperature based on the effective thermal load for the environmental control zone, the effective thermal response of the environmental control zone and the predetermined time period;
    operate an environmental control device to establish and maintain the set-back temperature for a portion of the predetermined time period; and
    operate the environmental control device to establish a desired temperature at an end of the predetermined time period.

20. The environmental control system according to claim 19, wherein, the computer readable program, when executed by the controller, causes the controller to: set a default effective thermal load value.

21. The environmental control system according to claim 19, wherein, the computer readable program, when executed by the controller, causes the controller to: calculate the set-back temperature based, in part, on estimated capacities and efficiencies of the environmental control system.

22. The environmental control system according to claim 19, wherein, the computer readable program, when executed by the controller, causes the controller to: calculate a first set-back temperature for a first environmental control zone and a second set back temperature for a second environmental control zone, the first set-back temperature being independent of the second set-back temperature.

23. The environmental control system according to claim 19, wherein, the computer readable program, when executed by the controller, causes the controller to: set a recovery time period to re-establish the desired temperature.

24. The environmental control system according to claim 23, wherein, the computer readable program, when executed by the controller, causes the controller to: determine a recovery time period in which maximum available recovery capacity is equal to total required recovery capacity to set the recovery time period.

25. The environmental control system according to claim 23, wherein, the computer readable program, when executed by the controller, causes the controller to: operate the environmental control system at maximum available recovery capacity during a first recovery portion of the recovery time period and operating the environmental control system at a lower capacity during a second recovery portion of the recovery time period to re-establish the desired temperature.

26. The environmental control system according to claim 23, wherein, the computer readable program, when executed by the controller, causes the controller to:
    set a target temperature that is distinct from the desired temperature;
    operate the environmental control system at a rate configured to establish the target temperature during a first recovery portion of the recovery time period; and
    operate the environmental control system at a rate configured to establish the desired temperature at a second recovery portion of the recovery time period to re-establish the desired temperature.

\* \* \* \* \*